United States Patent Office 3,494,099
Patented Feb. 10, 1970

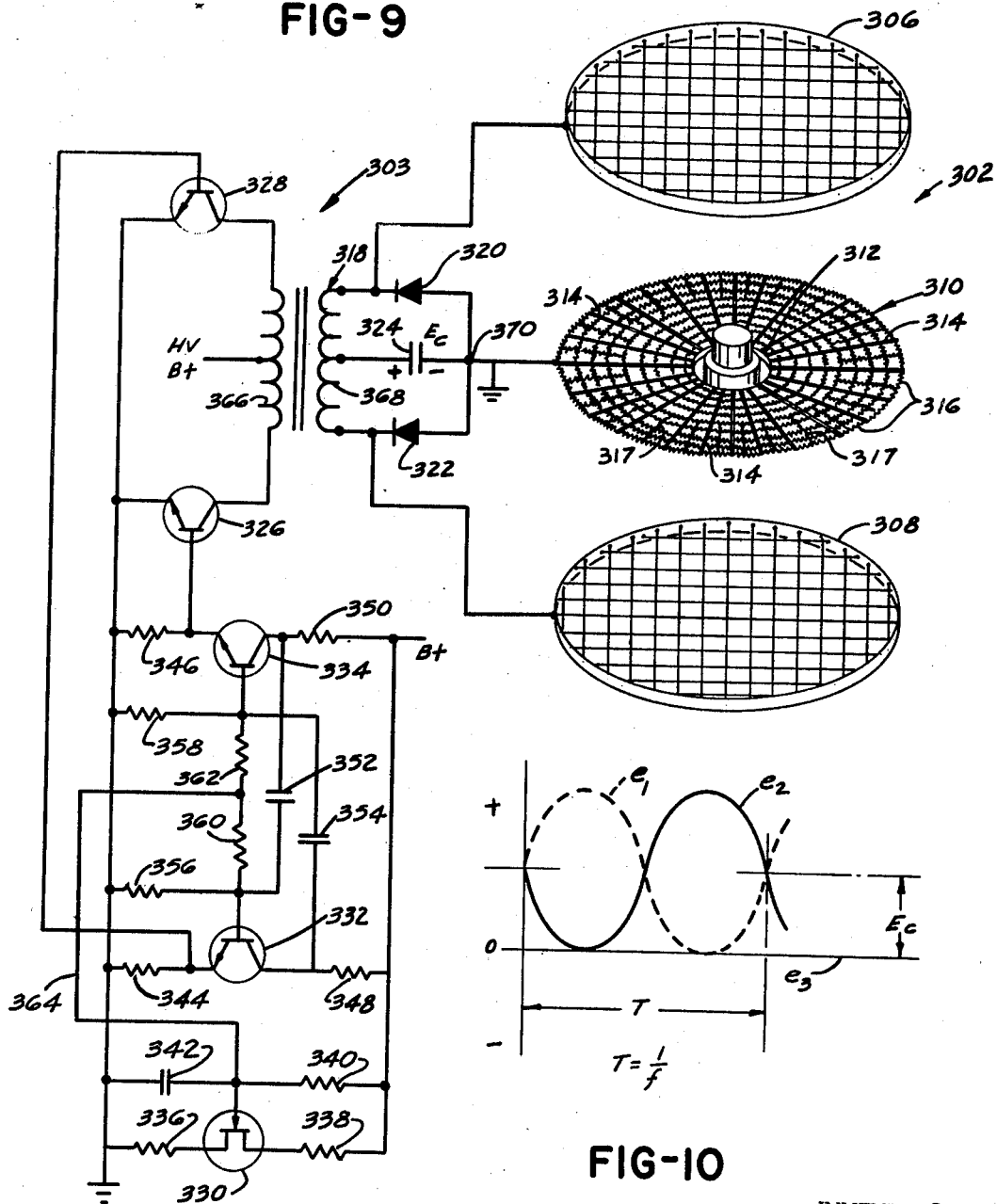

3,494,099
METHOD OF AND APPARATUS FOR PURIFYING POLLUTED GASES
Joseph W. Eng, Bayside, N.Y., and Stanley C. F. Lin, Matawan, N.J., assignors to Electro-Sonic Pollution Control Corporation, New York, N.Y., a corporation of Delaware
Filed Aug. 30, 1967, Ser. No. 664,416
Int. Cl. B03c 3/01
U.S. Cl. 55—8         26 Claims

ABSTRACT OF THE DISCLOSURE

A method and apparatus for removing contaminants from polluted gases having a low flow resistant, porous, infinite capacity filter in which ultrasonically generated, oscillating fog of substantially increased contact area and contact duration, contacts, absorbs and agglomerates contaminants carried by such gases, and from which the absorbed agglomerated contaminants are removed. Preferably the fog droplets are charged electrically and activated chemically, as well as generated in a range of sizes best suited for removing contaminants from the polluted gases. The gases can also be passed through ultrasonically generated fog, at least some of which is frequency modulated. The fog is provided downstream of the filter, and the polluted gases are passed through such fog before entering the filter.

---

Pollution of environments inhabited by human, animal or plant life is of grave and growing public concern. The discharge of carbon particles and sulphur and carbon gases into the atmosphere from heat, power and waste disposal combustion processes is a prime example of pollution upon which a good deal of this concern is focused.

Heretofore, efforts to remove solid and gaseous contaminants from gaseous streams, such as the exhaust or waste from industrially produced flue streams, with fresh water sprays, dry electrostatic precipitators, and cyclone separators have been generally unsatisfactory.

For example, high chimney structures are unsatisfactory, not only because of increased costs, but because of the contaminants which are still ultimately discharged into the atmosphere.

In addition, while presently available techniques are supposed to remove large or coarse solid particles present in contaminated gaseous streams, no provisions are made for effectively removing small micron and sub-micron sized solid particles. Accordingly, flue streams commonly carry fine injurious solid particles into atmosphere. Furthermore, such techniques commonly do not provide for the removal of undesirable gases from the contaminated streams, so that along with the fine particles carried by flue streams, carbon and sulphur gases are also exhausted to atmosphere.

Furthermore, efficient, low flow, resistant equipment which can be installed within gaseous discharging conduits, such as chimney stacks, has heretofore not been generally available. Rather, only separately installed costly and cumbersome systems are available which do not efficiently remove solid and gaseous contaminants from streams being exhausted to atmosphere.

It is one object of this invention to provide a new and improved method of and apparatus for eliminating pollution of environments inhabited by human, animal and plant life by efficiently removing contaminants from gaseous streams discharging or exhausting into such environments without undue installation and operating expenses.

Another object of this invention is to provide a new and improved method of and apparatus for removing atmospheric contaminants from gaseous streams within available equipment for exhausting or discharging such streams to atmosphere.

A further object of this invention is to provide a new and improved method of and apparatus for removing atmospheric contaminants which eliminates the need for the present high chimney structures.

Another object of the invention is to provide a filter of large surface area, deep filtering length, and an unlimited filtering capacity for removing contaminants contained in gaseous streams.

Still another object of this invention is to remove contaminants from polluted gases by passing such gases through a low flow resistant, porous, infinite capacity filter, in which ultrasonically generated, oscillating fog absorbs and agglomerates contaminants, and from which the absorbed and agglomerated contaminants are removed.

Another object of this invention is to generate contaminant removing fog that is ultrasonically generated to provide vibrating fog droplets and to three dimensionally oscillate such fog droplets to provide increased contact area and contact duration between the polluted gases and the fog.

A further object of this invention is to provide ultrasonically generated fog of liquid droplets composed of a range of sizes for wetting, absorbing and agglomerating a range of micron sized particles carried by a polluted gas.

Still another object of this invention is to provide within an industrial chimney stack an infinite capacity filter and a frequency modulated ultrasonic fog generator to remove solid particles and carbon and sulphur gases from a flue stream being exhausted to atmosphere.

Another object of this invention is to provide the frequency modulated ultrasonic fog generator and one or more large capacity fog generators within the chimney stack downstream of the infinite capacity filter to further facilitate removal of contaminants from the flue stream.

A further object of this invention is to provide automatically operated means for controlling the flow of polluted gases through the contaminant removing apparatus of the invention and for controlling the liquid used by such apparatus for removing the contaminants.

In accordance with the present invention, solid and gaseous contaminants are removed from polluted gases by a filter of low flow resistance, of large surface area, of substantial depth, and of infinite filtering capacity, and in which vibrating and oscillating liquid droplets contact, absorb and agglomerate gases and solid contaminants in the polluted gases, and from which agglomerated solids and agglomerated contaminant containing liquid formed from the droplets are continuously removed. An ultrasonic generator is provided within the filter that produces the vibrating droplets in the form of fog which has substantial height and depth and which continuously moves across said filter. At the same time an electric field and a sound wave are generated within the zone substantially perpendicular to and through the moving fog to cause three dimensional oscillatory motion of the vibrating fog droplets. The oscillation of the moving, vibrating fog doplets in multi-diections inceases many fold the contact area of the fog droplets and the contact duration between fog droplets and polluted gases. Thus, with increased contact area and contact time the liquid droplets are extremely effective in removing contaminants from polluted gases.

Furthermore, the ultrasonic generation of the fog is preferably frequency modulated to provide fog droplets having a range of micron sizes best suited to absorb and agglomerate the range of sizes of the solid contaminant generally carried by these polluted gases. In addition, the fog droplets are preferably charged electrically to increase their absorbing and agglomerating capacity of both solid and gaseous contaminants.

Also, in accordance with the present invention, all or essentially all of the contaminants can be removed from polluted gases, particularly hot polluted gases exhausted from industrial processes, in successive stages or zones through which the polluted gases are passed before being exhausted into the atmoshpere.

Briefly the polluted gases are initially passed through a first zone in which the large solid particles are scrubbed therefrom while the fine solid particles are wetted and material amounts of gaseous contaminants are absorbed. In one embodiment the scubbing, wetting and absorbing is accomplished by fog composed of vibrating droplets produced by one or more large capacity ultrasonic fog generators, the number of which relates to the volume of polluted gases and the degree of pollution thereof. In another embodiment the fog in the first zone is generated in one of other zones and moves into said first zone.

In a second zone, the scrubbed polluted gases are passed through frequency modulated ultrasonically generated fog wherein vibrating fog droplets are produced in a range of sizes best suited to agglomerate and cause removal of the range of sizes of solid particles still carried by the polluted gases. In this zone further amounts of the contaminating gases are also removed.

In a successive zone, and preferably the final zone, all or essentially all of the remaining contaminants are removed by the infinite capacity filter of the present invention. Removal of the contaminants from the polluted gases from this zone, as well as other zones of this embodiment, is accomplished by the forces of gravity acting upon the aggolmerated solid particles and the contaminant containing agglomerated liquid droplets.

The liquid used in generating the fog of the present invention is capable of wetting, absorbing and agglomerating the contaminants contained or carried by a polluted gas. Water, for these reasons, as well as for the availability and inexpensiveness, is preferred. Where water is used in generating the fog and where the polluted gases contain sulphur gases, moreover, the absorbed sulphur gases form with the water dilute sulphuric acid which is collected, cleansed and recycled back into the process to form chemically activated fog capable of absorbing additional quantities of gaseous contaminants.

In one embodiment of the apparatus of the invention, the filter comprises a frequency modulated ultrasonic fog generator positioned within the filter which produces a continuous, moving, deep blanket of fog across the filter that contains a range of droplet sizes, such as from about one micron to 100 microns. For three dimensional oscallation of the fog the filter includes two spaced, relatively stationary, porous grids or electrodes positioned to produce a strong electrical field substantially perpendicular to the generated fog, and an intermediate grid or electrode positioned to produce vibrations and a sound wave also substantially perpendicular to the generated fog. The electric field is produced between the outer grids by a first circuit means which applies an alternating, high voltage potential between the outer grids. At the same time a second circuit means applies a fixed potential to the intermediate grid. The alternating attraction of the intermediate grid to one outer grid and then the other causes the intermediate grid to vibrate and generate a sound wave.

In one embodiment, the frequency modulated ultrasonic fog generator of the invention uniformly and laterally dispenses fog composed of a range of fine, vibrating, water droplets for optimum wetting, absorbing, and agglomerating the range of solid particles commonly carried by polluted gases. Such fog generator includes a sound generator which laterally generates sound waves of variable frequency along with laterally discharging air under pressure. At the same time, water means provide an annular stream about the sound generator through which the sound waves and air under pressure move breaking the stream of water into fine vibrating droplets and carrying such droplets in the form of fog laterally outwardly. And control means vary the frequency of the sound generator to break the water droplets into the desired range of sizes for removing the different sizes of solid contaminants.

The large capacity ultrasonic fog generator of the present invention comprises a venturi having a converging section into which gas under pressure, such as air, is fed, a diverging section from which fog composed of vibrating liquid droplets carried by air under pressure discharged, and an intermediate throat having a slot thereacross through which liquid, such as water, is fed to form a continually flowing sheet of water across the throat. At the same time the air under pressure is formed into a converging air stream and fed into the throat above the slot, wherein the linear velocity of the air stream is increased to effect a sound wave. Such sound wave and the air stream then drives through the sheet of water flowing across the slot and continually breaks it up into fine water droplets with vibrating surfaces. Finally the commingled air under pressure and the fine water droplets are expanded in a controlled manner through the diverging section and flared therefrom into ultrasonically generated fog.

In accordance with the present invention, the method of and apparatus for removing contaminants from polluted gases can be embodied in available equipment for exhausting or discharging such gases to atmosphere, such as chimney stacks. Furthermore, such stacks containing the contaminant removing apparatus of the present invention can be of substantially less height than presently used because all or essentially all of the contaminants are removed from the polluted gases before being discharged into atmosphere within the lower segment of the stack.

To insure suitable flow of the polluted gases, such as through chimney stacks, and the removal of contaminants from such gases, the present invention also includes automatically controlled air blowing means that induces the flow of the polluted gases, as well as automatic control means operatively connected to the liquid supply means for controlling the supply of liquid in relation to the temperature and smoke density of the polluted gases.

The foregoing and other objects may be understood more fully from the following specification which sets forth an illustrative embodiment of the invention. Although the invention is described principally in connection for removal of contaminants from hot polluted flue gases, the invention is nevertheless applicable for removing contaminants from polluted gases produced by other sources. The drawings which are part of the specification consist of the following:

FIGURE 1 is a side elevational view, partly sectional and partly schematic, of a stack for a steam generating furnace containing one embodiment of the invention for removing contaminants from a flue stream being exhausted to atmosphere through the stack;

FIGURE 9 is a side elevational view, partly schematic and partly perspective, of one embodiment of the filter of the invention having a frequency modulated ultrasonic fog generator and electrically operated sound producing vibrator suspended in the stack in the zone designated C, together with a schematic wiring diagram of the circuit for producing said vibrations;

FIGURE 10 is a graphic representation of the high voltage alternating potential applied to the outer screen type grids of the filter relative to the potential applied to the vibrator.

Figure 1:
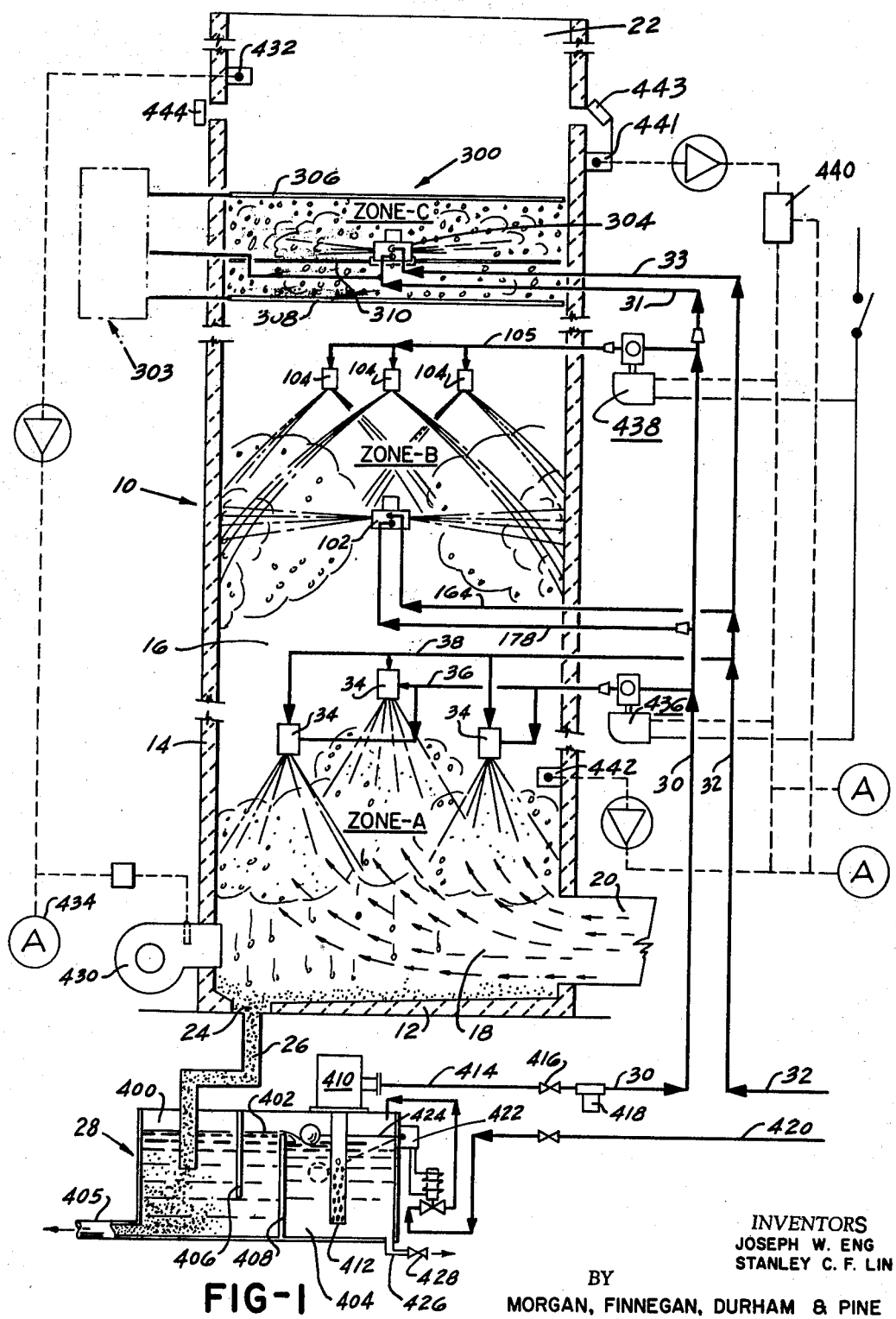

Referring to FIGURE 1 there is shown a vertically extending stack 10 having a base 12, and a cylindrical wall 14 extending upwardly therefrom forming a passage 16 connected at the lower end 18 to a flue 20 for carrying hot polluted gases from one or more steam generating furnaces, chemical processing equipment, or industrial burners, and open at its upper end 22 for discharging a purified flue stream to atmosphere.

The contaminants carried by the flue stream into the stack 10 essentially consist of solid carbon particles of submicron and micron sizes and sulphur and carbon gases. Within the stack passage 16 between such ends 18 and 22 is one embodiment of the apparatus for removing contaminants from the hot polluted gaseous stream.

In removing contaminants from the flue stream water is used which becomes activated by the absorbed sulphur gases to thereby form a solution of dilute sulphuric acid with increased absorbing capabilities. In this embodiment of the invention, the activated water is collected at the base 12 of the stack 10 along with solid particles removed from the flue stream, drained through a conduit 26 connected into the base 12 and a reservoir 28 where the particles are separated from the activated water. The cleansed activated water, with fresh make-up water added as required, is then recycled back into the process through a supply conduit 30. Simultaneously, air under pressure is fed from a source through a supply conduit 32 to the apparatus within the stack 10 which generates activated fog that removes the contaminants carried by the flue stream as will be presently explained.

Within the stack, contaminants are removed from the upwardly flowing flue stream in three superimposed vertical zones: zone A, zone B and zone C. These zones extend across the stack passage 16 and are completely open to one another so that there is some overlap in the actions of the zones.

Zone A forms the lowermost contaminant removing area and is positioned above the stack base 12 so that the hot polluted gases from flue 20 are discharged directly thereinto. In the upper portion of zone A for this illustration are three large capacity ultrasonic fog generators 34 suspended in spaced relationship for providing a fog across the stack passage 16 composed of fine vibrating chemically activated droplets as a uniform curtain through the upwardly counter-flowing hot polluted gases discharged into the stack 10 as shown in FIGURE 1. In zone A large solid carbon particles are scrubbed from the flue gas stream while the finer solid carbon particles are wetted for further processing. Furthermore, material amounts of the sulphur and carbon gases are absorbed by the vibrating chemically activated water droplets. The scrubbed particles and agglomerated containing droplets are removed by gravity collecting at the stack opening 24 for removal through the drain conduit 26.

In addition, the fog cools the temperature of the hot flue stream while such stream, in turn, thermally breaks the fine water droplets into still smaller sizes by converting them to steam. The steam so generated increases the absorbing and wetting effectiveness of droplets. With the temperature of the flue stream reduced, moreover, the velocity thereof also decreases, thereby providing additional time for scrubbing within zone A.

For generating the ultrasonic dispensed fog both compressed air and water are simultaneously fed to and through each of the generators. As schematically shown in FIGURE 1, the water containing dilute sulphuric acid is fed from the supply conduit 30 to a feed conduit 36 connected in a series to the generators 34. At the same time compressed air is fed from the supply conduit 32 to a feed conduit 38 also connected in series to such generators 34.

Figure 2:
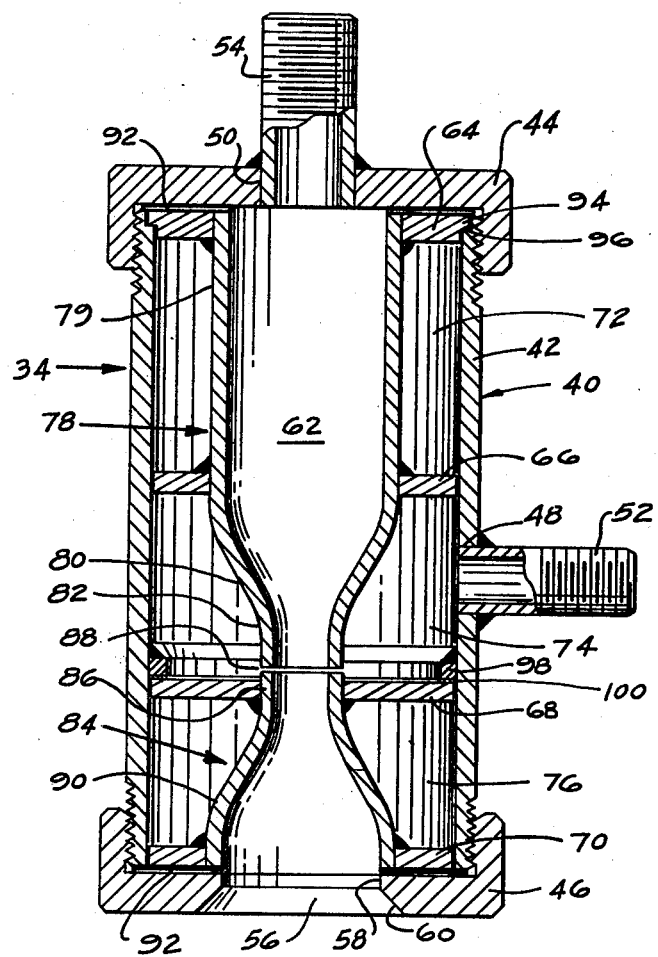
FIGURE 2 is a longitudinal, sectional view of one embodiment of the large capacity ultrasonic fog generator of the invention, several of which are suspended in the lower end of the stack in the zone designated in FIGURE 1 as zone A.

Each ultrasonic generator 34 produces large quantities of fog by comprising a hollow vertically positioned cylindrical housing 40 having a cylindrical shell 42 threaded at both ends to receive correspondingly threaded closure caps 44 and 46 as shown in FIGURE 2. Extending through the central portion of the shell 42 and the top cap 44 are bores 48 and 50 into which are welded inlet nipples 52 and 54 for the water and air feed conduits 36 and 38, respectively, shown in FIGURE 1. The bottom cap 46 includes an opening 56 therethrough having an inner annular portion 58 and a contiguous outer flared portion 60 communicating with the surrounding environment of the stack 10.

Vertically positioned within the housing 40 is a venturi 62 having spaced annular flanges 64, 66, 68 and 70, to slidably guide and position the venturi 62 within the cylindrical housing 40, and divide housing interior into three compartments 72, 74 and 76, with the middle compartment 74 communicating with the water inlet 52. The venturi 62 consists of two parts. The upper portion 78 of the venturi 62 consists of an inlet section 79 of uniform diameter which communicates with the air inlet 54, a converging section 80, and a segment 82 of a throat which is positioned in the middle compartment 74. The lower portion 84 of the venturi 62 consists of the other segment 86 of the throat spaced from the upper segment 82 to form a slot 88 thereacross adjustably opened to the middle compartment 74, and a diverging section 90 having an inside diameter at the outlet equal to the annular portion 58 of the opening 56 in the bottom cap 46. Sealing gaskets 92 with central openings to permit the desired communication between the venturi 62 and the air inlet 54 and opening 56 are provided between the caps 44 and 46 and outer flanges 64 and 70.

The outer flange 64 of the upper venturi portion 78 has an annular step down shoulder 94 which cooperates with an annular recess 96 in the upper portion 78 of the housing 40 to position it therewithin. The inner flange 66 of the venturi upper portion 78 forms upper wall of the middle water compartment 74. Correspondingly, the outer flange 70 of the lower venturi portion 84 rests upon the lower gasket 92 to position such portion within the housing 40. The inner flange 68 of the venturi lower portion 84 forms the bottom wall of the middle compartment 74.

Such flange 68 also cooperates with an annular stop ring 98 welded to the inner housing wall of the middle compartment 74 to provide a throat slot 88 of adjustable height. As shown in FIGURE 2 an annular gage plate 100 is positioned between the lower inner flange 68 and stop ring 98 to provide a throat slot 88 of maximum height. Such height can be decreased by removing the gage plate 100 and positioning another gasket 92 between the bottom cap 46 and outer flange 70 so that the inner flange 68 abuts the ring 98.

In practice activated water is continually fed through the water inlet 52 into the middle compartment 74 and across the slot 88 forming a continually flowing sheet of water thereacross. At the same time, air under pressure is fed through the air inlet 54 into the converging section 80 of the venturi 62 which forms an air stream and increases the linear velocity thereof. The upper segment 82 of the throat increases the linear velocity of the air stream to effect an ultrasonic sound wave which, together with the air stream, drives through the sheet of water flowing across the throat slot 88 and continually breaks it up into fine droplets with vibrating surfaces. The commingled air under pressure and the fine water droplets are then passed through the lower segment 86 of the throat to further increase the velocity of the air carrying droplets before being passed into the diverging section 90. In section 90 the water droplets and air under pressure are expanded in a controlled manner to the opening 56 and downwardly flared into stack passage 16 as ultrasonic generated fog.

For large quantities of fog, the generator 34 can typically include a venturi 78 with a converging section having an inlet diameter of 1.25 inches and an angle of convergence of about 45 degrees. The throat of such venturi is 0.3125 inch in diameter and the throat slot forms an opening of 0.025 inch in height. Such venturi also includes a diverging section having an angle of divergence of 45 degrees. Air under pressure, such as 100 pounds per square inch, is delivered to the venturi by an air supply nipple 54 having a nominal diameter of 0.5 inch. Correspondingly, the water is supplied to the chamber 74 by a water supply nipple also having a nominal diameter of 0.5 inch. The intensity of the sound wave generated by the venturi typically have an intensity of about 120 decibels and a frequency of greater than 15 kilocycles. The fog generated by such venturi comprises water droplets which are typically from about 1 micron to 100 microns in size.

With the venturi type of fog generators 34 just described substantially greater quantities of ultrasonically generated fog are now possible for scrubbing flue streams with greater effectiveness than heretofore possible with conventional water sprayers.

Upon emergence from the ultrasonically dispensed fog of zone A the upwardly flowing flue stream moves into zone B, as shown in FIGURE 1, still containing fine carbon particles and substantial quantities of carbon and sulphur gases. Within zone B is a centrally positioned frequency modulated ultrasonic fog generator 102 suspended above the generators 34 of zone A, and three umbrella type water sprayers 104 suspended above generator 102.

The frequency modulated ultrasonic fog generator 102 laterally and uniformly dispenses fog across zone B composed of a range of controlled fine sized, vibrating, chemically activated water droplets for maximum wetting, absorbing and agglomeration of the range of submicron and micron solid particles. By providing fog having water droplets of a range of controlled fine sizes removal of not only the larger particles but the smaller submicron size particles is accomplished, because the smaller water droplets wet, absorb and agglomerate the sub-micron size particles while the larger water droplets serve the same function for the larger particles.

Each of the water sprayers 104 positioned above the generator 102 is fed activated water from conduit 30 and from feed conduit 105, and projects an umbrella of downwardly flowing water droplets which in combination provide a uniform curtain of downwardly descending water droplets across the stack passage 16 complementing the previous actions of the generators 34 and 102 in removing contaminant from the upwardly flowing flue stream. The water droplets from the sprayers 104 absorb gaseous contaminants and agglomerate solid contaminants which are still carried by the flue stream ascending through the water curtain. Hollow cone nozzles that employ centrifugal force to break water into droplets can be used for such sprayers 104. Where pollution of the flue stream is not too great, the water droplets generated in zone B may also be sufficient to perform the scrubbing action in zone A as they descend therethrough. In such instance, the generators 34 need not be used.

Figure 5:
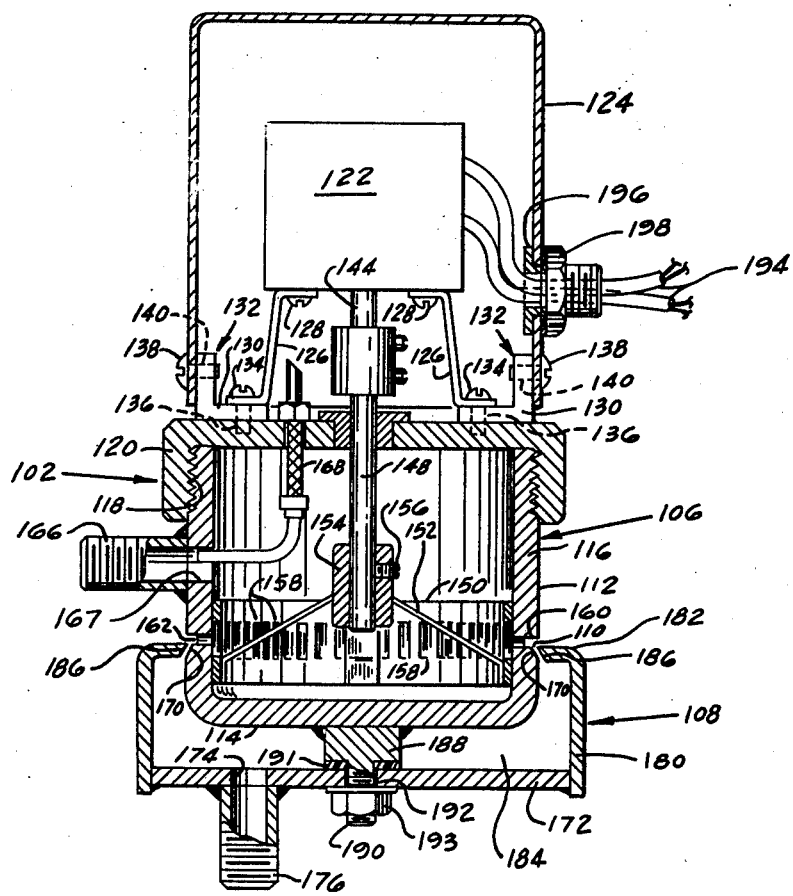
FIGURE 5 is a longitudinal cross sectional view of FIGURE 3.
Figure 7:
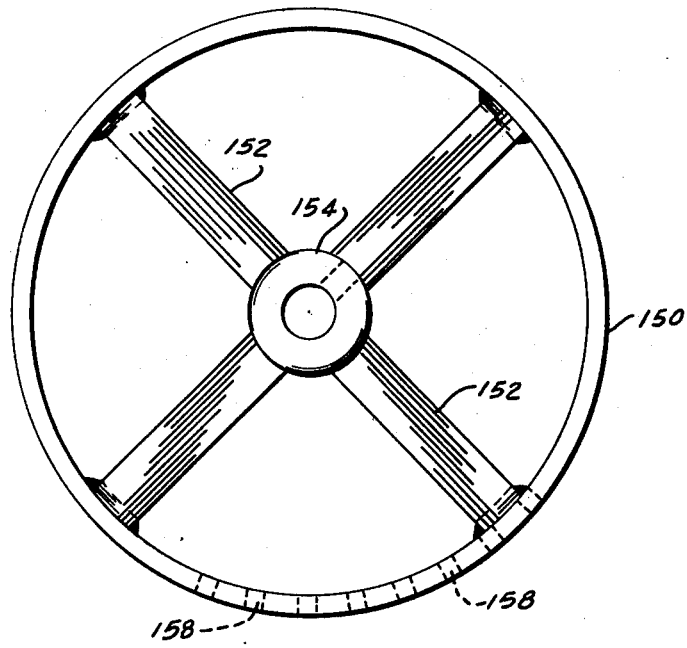
FIGURE 7 is a plan view of the sound generating ring of FIGURE 6.

As shown in FIGURE 5, the frequency modulated ultrasonic fog generator 102 includes a sound generator 106 which laterally generates sound of variable frequency together with discharging air under pressure. At the same time a water feed 108 defining an orifice 110 with the sound generator 102 produces an annular stream of water through which the sound and air under pressure move breaking it into fine vibrating droplets and carrying such droplets in the form of fog across zone B. By varying the frequency of the sound generator 102 the variable generated sound waves break the water droplets into a range of sizes best suited for removing the different sizes of solid particles within the flue stream.

Figure 4:
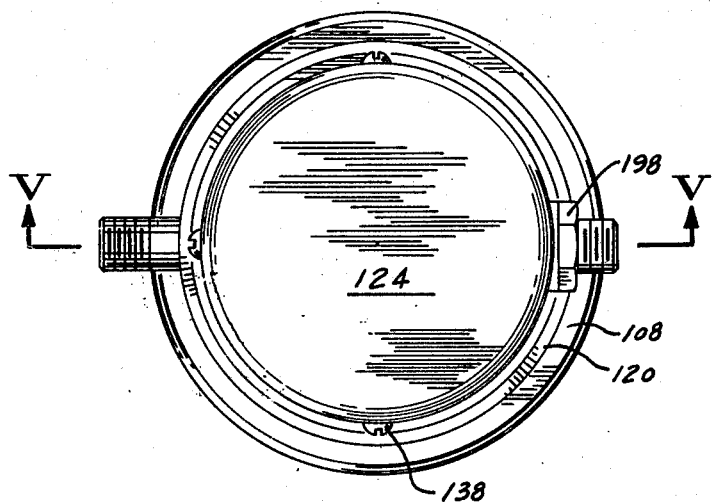
FIGURE 4 is a plan view of the frequency modulated ultrasonic fog generator of FIGURE 3.
Figure 3:
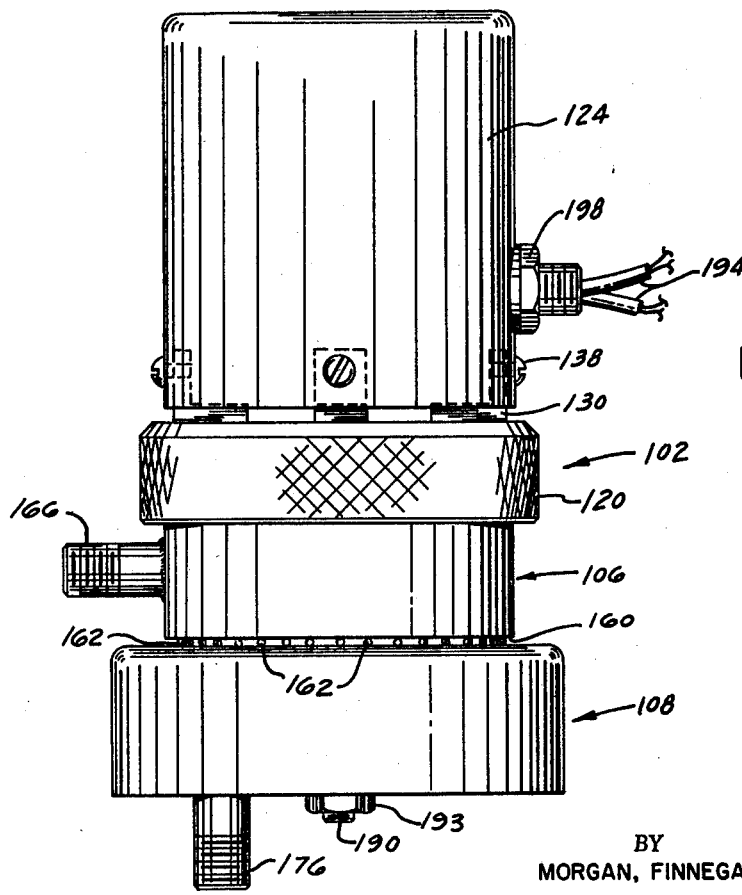
FIGURE 3 is a side elevational view of one embodiment of the frequency modulated ultrasonic fog generator of the invention, one of which is suspended in the stack in the zone designated B, and another one of which is suspended in the filter designated zone C, as shown in FIGURE 1.

As shown in FIGURES 3–5, the sound generator includes a cup 112 having a base 114, and an upwardly extending cylindrical wall 116 threaded at the lip 118 for securing a correspondingly threaded closure cap 120. Mounted atop the cup 112 on the closure cap 120 is a variable speed motor 122 and a protective cylindrical shroud 124. The motor 122 is secured to the cap 120 by opposing brackets 126 depending from and fastened at one end to the motor 122 by means of screws 128 and fastened at the other end to opposing horizontal legs 130 of L-shaped mountings 132 by screws 134 that extend through abutting leg and bracket portions into threaded taps 136 in the cap 120. Correspondingly, the shroud 124 is connected to and maintained a distance above the cap 120 by screws 138 which extend through the lower portion of the shroud wall and which are threaded through threaded hole 140 in the vertical legs of the L-shaped mountings 132.

The motor 122 has a depending drive shaft 144 connected to a coupling 146 positioned below the motor 122 and within the shroud 124. Secured to and depending from the other end of the coupling 146 is a shaft 148 and a sound generating ring 150 rotatably and slidably mounted within the lower portion of the cup 112. The ring 150 includes four spokes 152 secured at one end to the ring 152 and at the other end to a hub 154 centrally offset above the ring 150. The shaft 148 is extendable through and is secured to the hub 154 by means of a set screw 156. The position of the ring 150 within the cup 112 is adjustable because the shaft 148 can be secured in the hub 154 at varying shaft heights.

Figure 6:
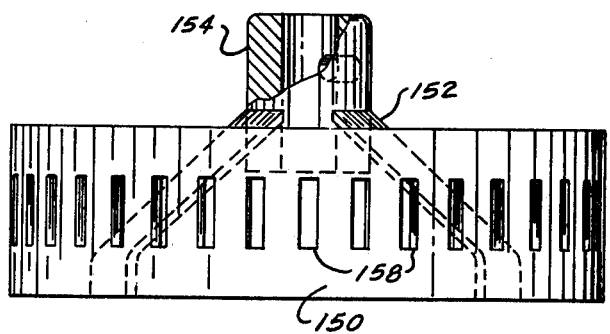
FIGURE 6 is a side elevational view, partly in section, of the perforated sound generating ring housed in the frequency modulated ultrasonic fog generator as shown in FIGURE 5.
Figure 8:
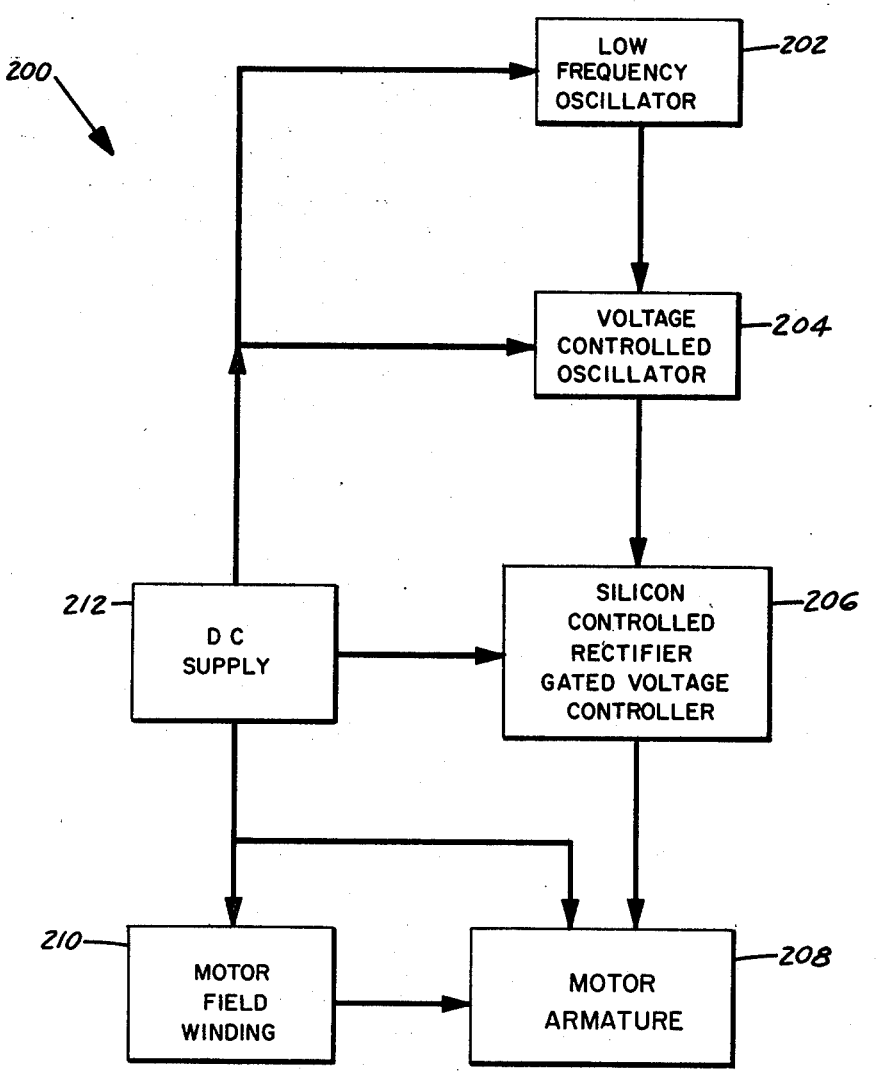
FIGURE 8 is a block diagram of the variable speed motor control for the frequency modulated ultrasonic fog generator shown in FIGURE 5.

The ring 150 also includes a plurality of air sound generating passage 158 which extend therethrough and which, as best shown in FIGURES 5 and 6, are in the form of rectangular slots. It is to be understood that such air passages can be of other sound generating shapes, such as squares or circles.

Extending about the lower portion of the cup wall 116 is an annular groove 160 recessed inwardly from the outer surface from the cup 112. Extending through the base of the groove 160 are a plurality of holes 162 spaced apart from one another and adapted to communicate with the rotated slots 158 of the ring 150 for generating sound. Like the air passages 158, the holes 162 can be formed of various shapes. In the illustrative embodiment, such holes 162 are circular with a diameter about equal to the height of the groove base and the width of the rectangular slots 158 while being about one-half the height thereof. As shown in FIGURE 5, the ring 150 is positioned within the lower portion of the cup 112 so that the holes 162 intermittently communicate with the central portion of the slots 158 as the ring 150 is rotated.

For feeding air under pressure into the cup 112, a feed conduit 164 is connected to the supply conduit 32 as shown in FIGURE 1, and to an air inlet nipple 166 which extends from and is welded to the cup wall 116 about a drilled hole 167 having a diameter equal to the inside diameter of the nipple 166. The drilled hole 167 is positioned in the central portion of the cup wall above the ring 150, as shown in FIGURE 5. An L-shaped conduit 168 having one end in the bore 166 and the other end extending through and secured to the closure cap 120 so as to be positioned immediately below the motor 122 siphons some of the air under pressure to cool the motor 122.

The cup 112 also includes an annular bevel 170 which serves as one surface of the water feed orifice 110. The bevel 170 is inwardly inclined from the lower edge of the groove 160 to and contiguous with the lower peripheral portion of the annular groove 160 which defines the holes 162.

For supplying water to the feed orifice 110, the feed 108 includes a circular base plate 172 having a hole 174 therethrough offset from the center thereof. Welded to the plate 172 about the hole 174 is a water inlet nipple 176 which is also connected to the water supply conduit 30 via feed conduit 178, as shown in FIGURE 1. Extending upwardly from the base plate 172 about the cup wall 116 is an annular sleeve 180 with an inturned rim 182 forming a water chamber 184. The inner edge 186 of the rim 182 serves as the other surface of the orifice 110 by defining an outwardly inclined bevel spaced from and parallel to the bevel 170.

To maintain the feed 108 and cup 112 in the desired spaced relationship, a support 188 is welded to the bottom of the cup 112 having a threaded stud 190 which extends through a central opening 192 in the base plate 172 to receive a nut 193 adjustably secured to said stud 190. A pre-gauged washer 191 positioned between underside support 188 and inside surface of base plate 172 provides the maximum opening of orifice 110. Such orifice opening can be decreased by adding additional pre-gauged washers to washer 191.

In practice, the motor 122 rotates the ring 150 within the cup so that the cup holes 162 are intermittently open to the interior of the cup via the slos 158. The pressurized air flow from the air conduit 164 and inlet nipple 166 to the cup and through the holes 162 is therefore intermittently interrupted with the result that sound is generated which laterally emanates from said holes 162 when communication with the cup interior is permitted by slots 158.

Simultaneously, a vertical upward annular stream of activated water is provided from the feed 108 through the orifice 110 about the holes 162, whereupon the laterally generated sound and air under pressure issuing therefrom moves into and through the water stream to break such stream into fine vibrating water droplets. The fine vibrating droplets are then carried laterally across zone B by the air under pressure in the form of fog.

The frequency of the generated sound relates to the speed of rotation of the ring 150 and the number of air passages 158 therethrough. Each frequency of generated sound predominantly produces droplets of one size so that by providing a range of frequencies droplets of different sizes are laterally carried across zone B. In so doing, the fog contains droplets of a size best suited to wet, absorb and agglomerate a particular sized solid particle carried by the flue stream. This is especially advantageous for removing the fine micron and sub-micron sized particles which have heretofore escaped into the atmosphere.

To produce sound at different frequencies, the variable speed motor 122 rotates the ring 150 at different preselected speeds. In turn, the speed of the motor 122 is controlled by a motor control circuit 200 shown in FIGURE 8 which is connected to said motor 122 by wires 194 extending through a grommet 196 secured to the shroud 124 by a lock nut 198 shown in FIGURE 5.

The frequency modulation rate of the motor control circuit 200 is achieved with a low frequency oscillator 202, such as a Hartley or Colpitts oscillator. The output of this oscillator 202 is used to drive the voltage at a controlled oscillator 204. A typical voltage controlled oscillator is the free running multi-vibrator shown in FIGURE 9 and described hereinafter. The output from the voltage controlled oscillator 204, in turn, controls the silicon controlled rectifier gated voltage controller 206 which can be one of the known motor speed controllers. The purpose of this controller 206 is to control the average current through the motor armature 208 of the motor 122. Also shown in FIGURE 8 are the motor shunt field 210 and the D.C. power supply 212 which are essential for the operation of frequency modulated ultrasonic generator 102.

Since the speed of a D.C. motor varies with respect to the current through its armature, the (SCR) controller 206 controls the speed of the motor 122 which, in turn, controls the frequency of the ultrasonic fog generator 102. The normal speed of the motor 122 depends on the free running frequency of the multi vibrator or voltage controlled oscillator 204, and the rate at which the speed of the motor 122 changes, or the rate of the ultrasonic frequency changes, depends on the low frequency oscillator 202 which modulates the voltage controlled oscillator.

Typically the frequency modulated ultrasonic fog generator 102 of the invention is supplied with air under pressure, such as 100 pounds per square inch, from an air inlet nipple having an 0.5 inch normal diameter. Correspondingly, the water is supplied to the generator 102 through a water inlet nipple 176 also having 0.5 inch nominal diameter. The frequency modulated ultrasonic fog generator of the invention produces a sound wave having an intensity greater than 110 decibels and a frequency from about 10 to 30 kilocycles.

From zone B the flue stream moves upwardly into the filtering zone C of low flow resistance, of large surface area, of substantial depth, and of infinite filtering capacity, wherein all or essentially all of the remaining solid and gaseous contaminants are removed from the flue stream. Upon emergence from zone C greater than 99.99% of all solid contaminants, including carbon particles of micron and sub-micron sizes, and known carbon and sulphuric gaseous contaminants are removed from the flue stream. The purified flue stream then passes through the balance of the stack 10 to atmosphere.

Within zone C is positioned the filter 300 of the invention which includes a frequency modulated ultrasonic fog generator 304, an electrical field generator and sound vibrator 310, and an electric vibrator control means 303.

Suitably suspended and centrally positioned within the filter 300 is the frequency modulated ultrasonic fog generator 304, the structure and function of which are the same as previously described for generator 102 of zone B. Water and air under pressure is fed to the generator 304 by feed conduits 31 and 32 connected to the water and supply conduits 30 and 32, respectively. As previously described, lateral emanating sound of preselected varying frequency and air under pressure break up an upwardly moving annular stream of water to produce lateral moving fog composed of chemically activated water droplets of varying sizes. In this zone, moreover, the droplets are charged electrically by the fixed potential of the vibrator 310 which is applied to water feed conduit 31 as will presently be described.

The field generator and vibrator 310 includes a pair of spaced stationary outer, circular, screen-type grids or electrodes 306 and 308 suitably supported and positioned across the stack passage 16 so as to be insulated from the stack 10. Centrally positioned between the grids 306 and 308 is a porous, circular, vibrating, sound generating grid 310 having a central ring 312 in which is suspended the fog generator 304. From the ring 312 extends a plurality of radial, rectangularly shaped spokes 314. Connected between each pair of spokes 314 are a plurality of spaced, arcuate shaped, coiled springs 316, forming with the springs between the other pairs of spokes circular vibrators. For strength radial coil springs 317 are connected between the outer pairs of arcuate shaped springs 316.

The screens 306, 308 and 310 are energized through a transformer 318 and the high voltage bias supply consisting of diodes 320 and 322 and filtering capacitor 324. The transformer 318 is powered through push-pull transistors 326 and 328 which, in turn, are power driven by a voltage control oscillator circuit.

The frequency modulated power supply includes a unijunction transistor 330 which is part of a frequency modulation control for saw tooth pulse generating stage, a pair of NPN transistors 332 and 334 which operate as a free running multivibrating stage, and the transistors 326 and 328 which operate as a power output stage. The bases of the unijunction transistor 330 are connected to ground and the positive source of supply through resistors 336 and 338, respectively. The RC circuit is formed by a resistor 340 and a capacitor 342 connected in series between the positive source and ground. The emitter of the unijunction transistor 330 is connected to the junction between the resistor 340 and the capacitor 342.

When the potential is applied to the pulse generating circuit a potential gradually builds up across capacitor 342 and when this potential reaches the breakdown potential of the transistor the capacitor discharges through one of the emitter base circuits of the transistor. As a result, a saw tooth signal is developed across the capacitor.

The emitters of transistors 332 and 334 in the multivibrator circuit are connected to ground via resistors 344 and 346, respectively, whereas the collectors are connected to the positive source through resistors 348 and 350. Capacitors 352 and 354 provide the cross coupling networks: capacitor 352 being connected between the collector and transistor 334 and the base transistor 332, and capacitor 354 being connected between the collector of transistor 332 and the base of transistor 334. The bases of transistors 332 and 334 are connected to ground respectively through resistors 356 and 358 and are also connected to one another through series resistors 360 and 362. The conductor 364 couples the junction of resistor 340 and capacitor 342 to the junction of the resistors 360 and 362.

The free running multi vibrator circuit including transistors 332 and 334 operates with the transistors alternately becoming conductive. The frequency of the oscillator is controlled by the RC coupling network 352, 354, 356 and 358 in conjunction with the synchronizing signal from the saw tooth pulse generator that supplied via conductor 364.

The collectors of amplifying transistors 326 and 328 are connected to opposite ends of a primary winding 366 of transformer 318, and the emitters of these transistors are connected to ground. The base of transistor 326 is coupled to the emitter of transistor 334 and the base of transistor 328 is connected to the emitter of transistor 332. A high voltage positive source is connected to the center tap of primary winding 366.

Transistors 326 and 328 are periodically, and alternately, driven into the conductive states as determined by the associated driving transistors 332 and 334 in the multi vibrator circuit. As a result, a square wave, alternating signal is developed across the primary winding having a fundamental frequency as determined by the RC circuit associated with unijunction transistor 330, and the free running frequency of the multi vibrator.

Transformer 318 is a high voltage step-up transformer capable of developing a 200,000 peak-to-peak voltage across the transformer secondary winding 368.

One end of secondary winding 368 is connected to stationary grid 306 and the other end of the winding is connected to stationary grid 308. The center vibrating grid 310 is coupled to the center tap of the secondary winding 368 through a capacitor 324. The capacitor 324 is charged by the pair of diodes 320 and 322 with the cathodes and the diodes connected to the ends of secondary winding 368 and the anodes and the diodes connected to a common junction 370 between capacitor 324 and the vibrating grid 310. Because of the high voltages appearing across the secondary winding of the transformer diodes 320 and 322 would normally consist of a series string of diodes including a sufficient number of diodes having a combined peak inverse voltage rate exceeding the peak secondary winding and the capacitor 324 voltage. For convenience, junction 370 is grounded so that their connections can be made to the vibrating grid without providing high voltage insulation.

Diodes 320 and 322 act as a rectifier circuit which develop a high voltage potential across capacitor 324. This potential is positive at the center tap and negative on the other plate of the capacitor having a voltage corresponding to the peak-to-peak potential of one-half of the secondary winding. The potentials developed on the outer grids with respect to the center grid (ground), are as shown in FIGURE 10. The potentials $e_1$ and $e_2$ represent the potentials applied to the grids 306 and 308 with respect to the center or vibrating grid 310, whereas the potential $e_3$ represents the potential which appears across capacitor 324. It should be noted that by providing an off center bias to the vibrating grid with respect to the outer stationary grids, the maximum peak-to-peak secondary voltage can be developed between vibrating grid and the outer grids. Thus the circuit including capacitor 324 and diodes 320 and 322 make it possible to develop twice the potential difference between adjacent grids than would otherwise be possible if the vibrating grid were connected directly to the center tap of secondary winding 368.

In practice, the frequency modulated ultrasonic generator 304 laterally and continuously discharges a uniform blanket of fog across the filter 300 immediately above the intermediate grid 310. As previously described the fog is composed of droplets having vibrating surfaces and being of a range of micron size best suited to remove the solid contaminant still carried by the flue stream. At the same time, the high voltage, alternating potential applied to the outer grids 306 and 308 produces a very strong electrical field vertically across the laterally moving fog to cause three dimensional oscillation of the water droplets. This oscillatory motion is further accentuated by the sound wave generated by the vibrating coiled springs of the intermediate grid 310 alternately attracted, in a continuous push-pull fashion, first to one outer grid and then to the other. Such combined lateral and normal motions imparted to the droplets affect their three dimensional movement, making the filtering fog very effective in absorbing and agglomerating the remaining contaminants in the flue stream. In addition, the electrical charge of the droplets still further enhances the contaminant absorbing properties thereof. As in the other zones the agglomerated particles and agglomerated water droplets containing contaminant are removed from the flue stream by gravity and collected at the base of the stack 10.

The effectiveness of the overall process herein described is dramatically shown by the following tabulation which sets forth the effectiveness of each zone of the process:

| Zone | Percent | | | |
|---|---|---|---|---|
| | Solid Contaminant | | | Sulphur Dioxide Gaseous Contaminant |
| | Less than 0.1 micron to 1 micron | 1 micron to 10 microns | Greater than 10 microns | |
| A | 20 | 70 | 80 | 20 |
| B+A | 50 | 90 | 99 | 50 |
| C+B+A | Greater than 99.99 | | | >99.99 |

As can be seen from the tabulation more than 99.99% of all solid contaminants irrespective of size and a like percent of gaseous contaminants are removed from the flue stream by the present invention.

As described at the outset of the illustrative embodiment activated water collected at the stack base 24 is drained through conduit 26 to reservoir 28, separated from the collected solid particles and recycled back into the process. For this purpose reservoir 28 has an inlet section 400 open to the drain conduit 26, an intermediate weir section 402, and an outlet section 404 from which the cleansed activated water is recycled back into the process.

The inlet section 400 has a drain 405 at the base thereof for removing collected solid particles which fall by gravity through the collected water to the base of such section 400. To prevent flow of solid particles to the outlet section 404, the intermediate weir section 402 includes a pair of spaced plates 406 and 408. Plate 406 depends from the top of and is of a height less than the height of the reservoir 28. Correspondingly, plate 408 extends from the bottom of the reservoir 28 and is also of a height less than the height of the reservoir.

Mounted atop the reservoir 28 is a vertical suction pump 410 having an intake strainer 412 depending into the outlet section 404. The pump outlet is, in turn, connected to the water supply conduit 30 via interconnecting feed conduit 414. Shut-off valve 416 and strainer 418 are provided in the conduit 414 as a further flow and cleansing control of activated water.

Fresh make-up water is added to the reservoir section 404 as required from a make-up water source connected to the outlet section 404 via conduit 420. To control the flow of fluid to the section 404, a solenoid operated valve 422 is connected in the conduit 420. The solenoid of the valve 422 is actuated by a water level indicator 424 which floats upon the water in the outlet section 404. When the level indicator 424 is in the phantom position shown in FIGURE 1, the solenoid opens the valve 422 to permit the flow of make-up water into section 404. As the level indicator 424 rises with the increase of water and reaches the position shown by the solid lines, the solenoid valve 422 is closed to stop flow of the make-up water.

As also shown in FIGURE 1, the outlet section 404 is provided with a drain 426 in which there is a shut-off valve 428. Normally the valve 422 is closed but in case of excess fluid in the outlet section 404, the valve 428 is opened to restore a suitable level within the reservoir 28.

The purifying process described herein is of low flow resistance. However, extreme pollution conditions may require particularly heavy concentration of water droplets within the stack passage 16. To insure proper flue flow at all times, a motor operated induction fan 430 is connected into the lower end of the stack 10. Operation of the fan 430 is controlled by a flue velocimeter 432 attached to the inner wall of the stack 10 above zone C as shown in FIGURE 1. When the flue flow falls below the desired level, the velocimeter 432 causes the motor operated fan 430 to introduce fresh air into the flue stream until the flue flow once again reaches the desired level. An air flow indicator and alarm 434 is also connected to the velocimeter 432 to provide a visual and audible warning to an operator.

To vary the amount of water droplets generated within the stack 10 relative to the smoke density and temperature of the flue stream there is provided a pair of solenoid operated valves 436 and 438 connected into the water feed conduit 36 and 105 for the generators 34 and sprayers 104, respectively, controlled by computer system 440. The valves 436 and 438 are normally pre-set to permit sufficient water flow therethrough for the removal of normal contaminant quantities carried by the flue stream. Whenever the quantities of contaminants are increased, the valves 436 and 438 are opened further by the system 440 to allow additional quantities of water to flow therethrough for producing an increased concentration of water droplets.

Figure 11:
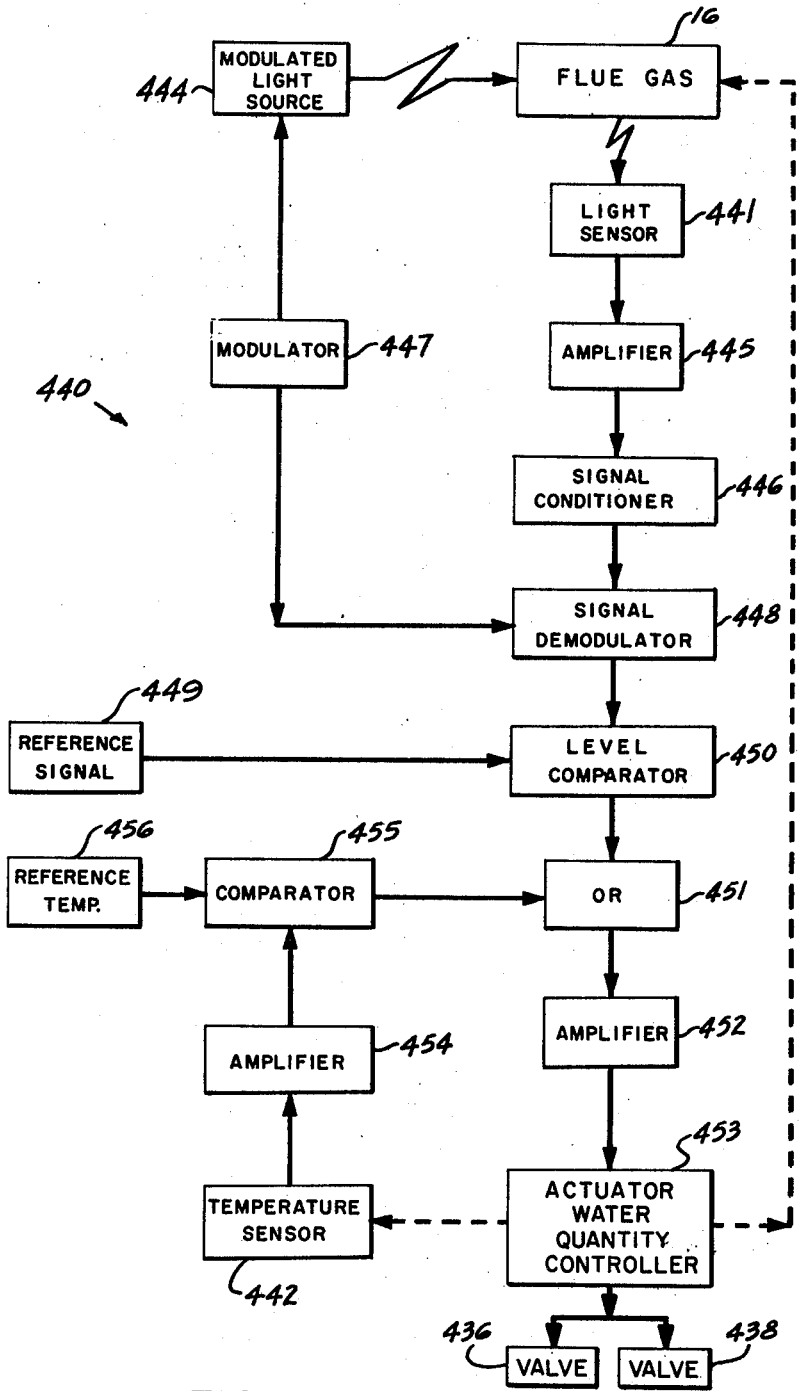
FIGURE 11 is a block diagram of the smoke and temperature sensing liquid flow control system for the apparatus of the invention within the stack as schematically shown in FIGURE 1.

The computer control system 440 for controlling the water dispensed through the water sprayers 104 and fog sprayers 34 is shown in greater detail in FIGURE 11. The computer control includes two independently operating control loops, one control loop operating to increase the water flow as the smoke density increases as determined by a detector 441, and the other control loop operates to increase the water flow as the temperature increases as determined by a temperature detector 442.

Temperature detector 442 can be any conventional temperature measuring device, such as a temperature responsive resistance or a thermocouple, which provides an electrical signal proportional to temperature. The smoke density detector includes a modulated light source 444 which provides a modulated light beam which crosses the stack passage 16 and is then reflected off a mirror 443 to a photocell detector 441. Thus, as the smoke density increases the amount of light received by detector 441 decreases and therefore the magnitude of the electrical signal provided by the detector decreases proportionally.

Referring to FIGURE 11 it should be noted that the controlled circuitry includes two independent control loops. As previously described in connection with FIGURE 1, the modulated light source 444 provides a light beam which passes through the stack passage 16 and is detected by a light sensor 441. The electrical signal provided by the light sensor is amplified in an amplifier 445 and passes through a signal conditioner 446 which is designed to remove extraneous noise from the signal. Light beam detectors are inherently noisy and it is therefore desirable to modulate the light beam by means of a modulator 447. The modulator amplitude modulates the light beam as provided by the source 444 and also provides a signal to a signal demodulator 448 so that all extraneous noise can be eliminated from the electrical signal.

A reference signal source 449 provides a controlled electrical signal corresponding to the desired smoke density in the stack passage 16. The reference signal is compared with the demodulated signal in a level comparator circuit 450 so that the level comparator circuit provides an outlet signal when the demodulated signal deviates from the value of the reference signal.

The output signal from the level comparator passes through an isolating OR circuit 451 and an amplifier 452 to in turn control the valve actuator 453 connected to valves 436 and 438 and thereby control the water quantity supply to the stack passage 16. Thus, whenever the smoke density exceeds the predetermined value determined by the reference signal, actuator 453 operates the solenoids to further open the valves 436 and 438 and thereby increase the water supply to the stack passage. Since the quantity of water injected into the stack passage affects the smoke density, and this effect appears in the signal provided by the light sensor, the system operates in a closed loop fashion to control smoke density.

The other control loop of the computer control circuit includes the temperature sensor 442 which provides an electrical signal proportional to temperature in the stack passage. This electrical signal is amplified in an amplifier 454 and supplied to the electrical comparator circuit 455. The reference temperature source 456 provides an electrical signal determined increase with the desired stack temperature. The reference signal and the signal from the temperature sensor are compared in comparator circuit 455 which provides an electrical output signal to OR circuit 451 whenever the stack temperature exceeds the desired value. The electrical signal from the comparator passes through the OR circuit and amplifier 452 to control the water quantity actuator 453 as previously explained. OR circuit 451 provides an isolating function so that the comparators 450 and 455 will not interfere with one another.

Increased water flow into the stack passage tends to decrease the temperature and this effect is sensed by the temperature sensor 442. As a result, the temperature control circuit also operates in a closed loop fashion.

Indicators and alarms diagrammatically illustrated and designated in FIGURE 11 as A are connected to the computer control system 440 to give visual and audible indications of the temperature level at the temperature detector 442 and the smoke density at the smoke detector position above zone C.

Thus, the method of and apparatus for the present invention are flexible and ready to meet changing conditions of the polluted gaseous stream.

While this invention has been particularly described in the illustrative embodiment with respect to removing contaminants from a flue stream of a steam generated furnace, it is to be understood that this invention can be used to remove contaminants from polluted gases generated from other processes such as in steel mills, chemical process plants, sulphur manufacturing plants, metal processing plants and food processing plants.

The invention in its broader aspects therefore is not limited to the illustrative embodiment but departures can be made therefrom within the scope of the accompanying claims without departing from the principles of the invention and without sacrificing its chief advantages.

What is claimed is:

1. A method for removing contaminants from a polluted gas in a filter comprising: forming a stream from the polluted gas within a confined area for passage through the filter, ultrasonically generating fog of vibrating liquid droplets in said filter and within and across said confined area, generating an alternating electrical field in said filter and within said confined area substantially perpendicular to and across said moving vibrating liquid droplets to effect three dimensional oscillation thereof for increasing their contact area and duration, passing said polluted gas stream through said vibrating and oscillating droplets moving across said confined area wherein said droplets contact, absorb and agglomerate contaminant within said stream, and removing the agglomerated contaminant and agglomerated contaminant containing droplets from the stream.

2. A method for removing contaminants from a polluted gas in a filter comprising: forming a stream from the polluted gas within a confined area downstream of the filter, ultrasonically generating fog of vibrating liquid droplets of micron sizes within and across said confined area, generating an alternating electrical field within said confined area perpendicular to and across said moving vibrating droplets to effect three dimensional oscillation thereof to increase their contact area and duration, passing said stream through the filter and within said confined area during which said vibrating and oscillating micron sized droplets contact, absorb and agglomerate contaminants within the polluted gas stream, and removing the agglomerated contaminant and agglomerated contaminant containing droplets from said stream.

3. The method for removing contaminants from the polluted gas stream recited in claim 2 comprising: generating a sound wave within said confined area and through said moving fog to increase the three dimensional oscillation of said vibrating fog droplets.

4. The method for removing contaminant from the polluted gas stream recited in claim 2 comprising: simultaneously generating the sound wave and the alternating electrical field within the filter and through said moving fog to impart the three dimensional oscillation to said vibrating fog droplets.

5. The method for removing contaminant from the polluted gas stream recited in claim 2 comprising: frequency modulating the ultrasonic generation of the fog to produce vibrating droplets including a range of micron sizes for agglomerating solid contaminants of a range of sizes normally carried by the polluted gas stream.

6. The method for removing contaminant from the polluted gas stream recited in claim 5 comprising: generating electrically charged frequency modulated ultrasonic fog for increasing the absorbing capabilities of said droplets.

7. The method for removing contaminant from the polluted gas stream recited in claim 5 comprising: forming the filter within a chimney stack, and forming said stream from hot polluted flue gases.

8. The method for removing contaminant from a polluted gas in successive zones comprising: forming a stream from the polluted gas before a said stream enters said zones, ultrasonically generating fog which moves across one of said zones including vibrating water droplets, passing said polluted gas stream through said one zone during which said vibrating fog droplets contact, absorb and agglomerate the contaminant carried by said stream, ultrasonically generating fog within and across another zone downstream from said one zone including vibrating water droplets of micron size, generating an alternating electrical field within said downstream zone substantially across and perpendicular to said moving vibrating liquid fog droplets to effect three dimensional oscillation thereof for increasing the contact area and contact duration between said fog droplets and said stream, passing said stream from said first zone to and through said downstream zone during which the vibrating oscillating fog droplets contact, absorb and agglomerate contaminant still carried by said stream, and removing agglomerated contaminant and agglomerated containing droplets from said stream as it passes through each of said zones.

9. The method for removing contaminants including sulphur gases from a hot polluted flue stream in successive zones comprising: ultrasonically generating fog within and across one zone including vibrating water droplets, passing said polluted flue stream through said one zone during which said vibrating water droplets contact, absorb and agglomerate contaminant contained in said flue stream, ultrasonically generating fog within and across a second zone including vibrating water droplets having a range of micron sizes by frequency modulating such generation, passing said flue stream from said one zone to and through said second zone during which the vibrating water droplets contact, absorb and agglomerate contaminant still carried by the flue stream, said size range of water droplets agglomerating the size range of solid contaminant within the flue stream, ultrasonically generating fog within and across a third zone upstream of said second zone including vibrating water droplets of micron size, generating an electrical field within said third zone substantially across and perpendicular to said moving vibrating liquid droplets in said third zone to effect three dimensional oscillation thereof for increasing the contact area and duration between said water droplets and the flue stream, passing the flue stream from said second zone into and through said third zone during which said vibrating oscillating water droplets contact, absorb and agglomerate all or essentially all of the remaining contaminant within said flue stream, and continuously removing agglomerated contaminant and agglomerated containing water droplets from each of said zones.

10. The method for removing contaminants from the flue stream recited in claim 9 comprising: frequency modulating the ultrasonic generation of fog droplets in said third zone to provide fog moving across said third zone including water droplets having a range of sizes for absorbing and agglomerating the range of sizes of solid contaminant still remaining in the stream.

11. The method for removing contaminant from the flue stream recited in claim 9, wherein said absorbed sulphur gases form with said water droplets dilute sulphuric acid comprising: collecting the agglomerated contaminant and agglomerated sulphuric said containing water removed from said zones, removing the solid contaminant from the collected sulphuric acid containing water and recycling the cleansed sulphuric acid containing water for the generation of chemically activated fog.

12. The method for removing contaminant from the polluted stream recited in claim 9 comprising: automatically detecting whether the stream upon emergence from said third zone contains contaminant, and automatically increasing the quantity of fog droplets in at least one of said zones whenever the stream still carries measurable amounts of contaminants beyond said third zone.

13. The method for removing contaminant from the polluted stream recited in claim 9 comprising: automatically detecting the temperature of said stream as it enters said first zone, and increasing the quantity of fog droplets in at least one of said zones whenever the temperature of the stream is higher than normal.

14. The method for removing contaminant from the flue stream recited in claim 9 comprising: automatically detecting the rate of flow of the stream upon emergence from said third zone, and automatically introducing air under pressure into said stream downstream of said first zone whenever the flow of the stream falls below normal.

15. Apparatus for removing contaminant from a polluted gas stream passing through a conduit including a low flow resistant, porous, infinite capacity, contaminant removing filter comprising: an ultrasonic fog generator positioned in said filter and within and across said conduit generating vibrating fog droplets, a pair of spaced grids positioned with said generator therebetween, electrical circuit means operatively connected to said grids for applying thereto a high voltage potential which produces an electrical field therebetween substantially perpendicular to and through said fog causing three dimensional oscillation thereof, means for feeding said polluted gas through said filter in which the oscillating vibrating fog droplets contact, absorb and agglomerate contaminants within said polluted gas, and means for continuously removing the absorbed and agglomerated contaminants from said filter.

16. Apparatus for removing contaminant from a polluted gas stream passing through a conduit including a low flow resistant, porous, infinite capacity filter for removing contaminant from a polluted gas comprising: three porous, spaced grids positioned in the conduit, the outer grids being relatively stationary and the intermediate grid being a vibrating grid; a frequency modulated ultrasonic fog generator positioned in said conduit between the outer grids and generating fog including vibrating droplets of a range of sizes in front of and across said intermediate vibrating grid; first electrical circuit means operatively connected to said outer grids for applying a high voltage, alternating potential therebetween, and a second electrical circuit means connected to said intermediate grid for applying a fixed direct current potential thereto for causing the alternating attraction of said intermediate grid first to one outer grid and then the other in a vibrating manner which produces sound waves within the filter that move substantially perpendicularly to and through said vibrating droplets for three dimensional oscillation thereof; means for feeding said polluted gas through said filter in which the oscillating, vibrating fog droplets contact, absorb and agglomerate contaminants within said polluted gas; and means for continuously removing the absorbed and agglomerated contaminants from said filter.

17. The infinite capacity filter recited in claim 16, wherein a ground potential is applied to said vibrating grid.

18. The infinite capacity filter recited in claim 16, wherein the potential applied to said vibrating grid is biased off center with respect to the alternating potential applied to said outer grids.

19. The infinite capacity filter recited in claim 16, wherein the potential applied to said vibrating grid is substantially equal to the peak value of said alternating potential.

20. The infinite capacity filter recited in claim 16, wherein said first electrical circuit means comprises the secondary of a transformer, wherein said second electrical circuit means comprises a potential storage means connected to the center of said secondary winding of the transformer, and further comprising a variable frequency oscillator operatively connected to energize the primary winding of said transformer.

21. Apparatus for removing contaminant from a polluted gas stream passing through a conduit comprising: an ultrasonic fog generator suspended within said conduit for generating fog of vibrating water droplets thereacross; a low flow resistant, porous, infinite capacity filter downstream of said ultrasonic fog generator including a frequency modulated ultrasonic fog generator positioned within said conduit and generating vibrating fog droplets having a range of sizes, a pair of spaced grids in said conduit positioned with said frequency modulated ultrasonic fog generator therebetween, and electrical circuit means operatively connected to said grids for applying thereto a high voltage potential which produces an electrical field therebetween substantially perpendicular to and through said fog causing three dimensional oscillation thereof; said fog droplets generated by said ultrasonic fog generator and said filter contacting, absorbing and agglomerating contaminants within said polluted gas; and means for continuously removing the absorbed and agglomerated contaminants from said conduit.

22. The apparatus recited in claim 21 comprising: means connected to said conduit for automatically detecting whether the stream upon emergence from said filter contains contaminant; and flow control means connected to said fog generating means for increasing the volume of fog droplets whenever the stream contains measureable amounts of contaminants beyond said filter.

23. The apparatus recited in claim 22 comprising: means connected to said conduit for automatically detecting the temperatue of said stream passing thereby; and a flow control means connected to said fog generating means for increasing the volume of fog droplets whenever the temperature of the stream is above normal.

24. The apparatus recited in claim 22 comprising: means connected to said conduit for automatically detecting the rate of flow of said stream passing said means; and induction fan means for automatically introducing air under pressure into said stream whenever the flow of the stream falls below normal.

25. The apparatus recited in claim 22, wherein said conduit is a vertical chimney stack.

26. The apparatus recited in claim 22 comprising: a conduit for removing the agglomerated and absorbed contaminant from said chimney stack; a reservoir for collecting said agglomerated and absorbed contaminant; a weir within said reservoir for separating the collected solid contaminant from the collected liquid; and pump operated means connected to said reservoir for recycling said separated liquid to said fog generating means and said frequency modulated ultrasonic fog generator.

References Cited

UNITED STATES PATENTS

| | | | |
|---|---|---|---|
| 2,935,375 | 5/1960 | Boucher | 55—15 |
| 3,026,966 | 3/1962 | Asklof | 55—15 |
| 3,040,497 | 6/1962 | Schwab | 55—123 |
| 3,389,971 | 6/1968 | Alliger | 55—15 |
| 3,390,869 | 7/1968 | Alliger | 55—15 |
| 3,395,510 | 8/1968 | Barnes | 55—20 |

FOREIGN PATENTS

| | | |
|---|---|---|
| 301,930 | 11/1929 | Great Britain. |

REUBEN FRIEDMAN, Primary Examiner

C. N. HART, Assistant Examiner

U.S. Cl. X.R.

55—15, 122, 126, 223